United States Patent
Yamazaki

(10) Patent No.: US 6,639,528 B1
(45) Date of Patent: Oct. 28, 2003

(54) APPARATUS FOR MULTI-CHANNEL SIGNAL PROCESSING AND COMMUNICATION TERMINAL USING THE SAME

(75) Inventor: Kiyohiko Yamazaki, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/609,320

(22) Filed: Jun. 30, 2000

(51) Int. Cl.$^7$ .............................................. H03M 1/00
(52) U.S. Cl. ..................... 341/110; 341/126; 341/143; 341/144; 341/146; 341/157; 710/69
(58) Field of Search ............................. 341/143, 144, 341/146, 157, 126, 110; 710/69

(56) References Cited

U.S. PATENT DOCUMENTS

| | | | | |
|---|---|---|---|---|
| 3,629,856 A | * | 12/1971 | Arai .......................... 340/172.5 |
| 4,389,644 A | * | 6/1983 | Abiko .................... 340/825.52 |
| 5,128,943 A | * | 7/1992 | Tulpule ........................ 371/9.1 |
| 5,227,987 A | * | 7/1993 | Imazawa et al. ............ 708/524 |
| 5,313,648 A | * | 5/1994 | Ehlig ........................... 395/800 |
| 5,497,373 A | * | 3/1996 | Hulen et al. ................... 370/79 |
| 5,535,356 A | * | 7/1996 | Kim et al. .................... 395/430 |
| 5,610,943 A | * | 3/1997 | Kakuishi ..................... 375/243 |
| 5,619,641 A | * | 4/1997 | Ohuchi ........................ 395/181 |
| 5,687,308 A | * | 11/1997 | Jardine et al. ................. 714/11 |
| 6,016,700 A | * | 1/2000 | Cuffe ........................... 73/602 |
| 6,041,302 A | * | 3/2000 | Bruekers ..................... 704/503 |
| 6,078,972 A | * | 6/2000 | Takai .......................... 710/69 |
| 6,108,765 A | * | 8/2000 | Caudel ......................... 712/32 |
| 6,321,181 B1 | * | 11/2001 | Havens ......................... 703/13 |

* cited by examiner

Primary Examiner—Michael Tokar
Assistant Examiner—Khai M Nguyen
(74) Attorney, Agent, or Firm—Rabin & Berdo, P.C.

(57) ABSTRACT

A signal processing apparatus includes a first signal processor which processes a first channel of signal; and a second signal processor which processes a second channel of signal independently from the processing by the first signal processor.

14 Claims, 7 Drawing Sheets

PRIOR ART

PRIOR ART

PRIOR ART

APPARATUS FOR MULTI-CHANNEL SIGNAL PROCESSING AND COMMUNICATION TERMINAL USING THE SAME

TECHNICAL FIELD OF THE INVENTION

The present invention relates to apparatus for processing signals transmitted on a plurality of different channels, such as a CODEC (Coder/Decoder). The present invention also relates to a communication terminal using an apparatus for multi-channel signal processing.

BACKGROUND OF THE INVENTION

A conventional signal processing apparatus, which processes a single channel of signals, includes a signal processor connected at an input terminal to an analog/digital (A/D) converter and at an output terminal to a digital/analog (D/A) converter. The other output terminal of the signal processor is connected to a compressor, which compresses a processed signal to generate an output signal. The other input terminal of the signal processor is connected to an expander, which expands a digital input signal to generate a signal to be processed in the signal processor.

The signal processor includes a PROM (Programmable ROM), storing necessary program for signal processing; a decoder, which decodes the program stored in the PROM; a DROM (Data ROM); and a RAM. The signal processor may further include a multiplier; an adder; an accumulator; and a data bus.

In the signal processor, a predetermined processing, such as filtering, is carried out to digital signals on a single channel in accordance with the program read from the PROM.

Recently, it has been required to process different channels of digital signals in a circuit, such as a CODEC. However, when a plurality of different channels of signals is processed in a circuit, electric current flowing therein increases and some problems, such as power supply voltage noise, etc. are created.

OBJECTS OF THE INVENTION

Accordingly, an object of the present invention is to provide an apparatus for multi-channel signal processing, in which undesirable electric current is decreased.

Another object of the present invention is to provide a communication terminal unit having a signal processor, which operates with a low noise of power supply voltage.

Additional objects, advantages and novel features of the present invention will be set forth in the description that follows, and will become apparent to those skilled in the art upon examination of the following or may be learned by practice of the invention. The objects and advantages of the invention may be realized and attained by means of the instrumentalities and combinations particularly pointed out herein.

SUMMARY OF THE INVENTION

According to a first aspect of the present invention, a signal processing apparatus includes a first signal processor which processes a first channel of signal; and a second signal processor which processes a second channel of signal independently from the processing by the first signal processor. In the above described first aspect of the present invention, preferably, the first signal processor operates in accordance with a first clock, and the second signal processor operates in accordance with a second clock. And, the first clock and second clock may be shifted in phase so that electric current flowing in the apparatus is dispersed and decreased.

According to a second aspect of the present invention, a communication terminal unit includes the signal processing apparatus of the above-described first aspect of the present invention.

DETAILED DISCLOSURE OF THE INVENTION

In the following detailed description of the preferred embodiments, reference is made to the accompanying drawings which form a part hereof, and in which is shown by way of illustration, specific preferred embodiments in which aspects of the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
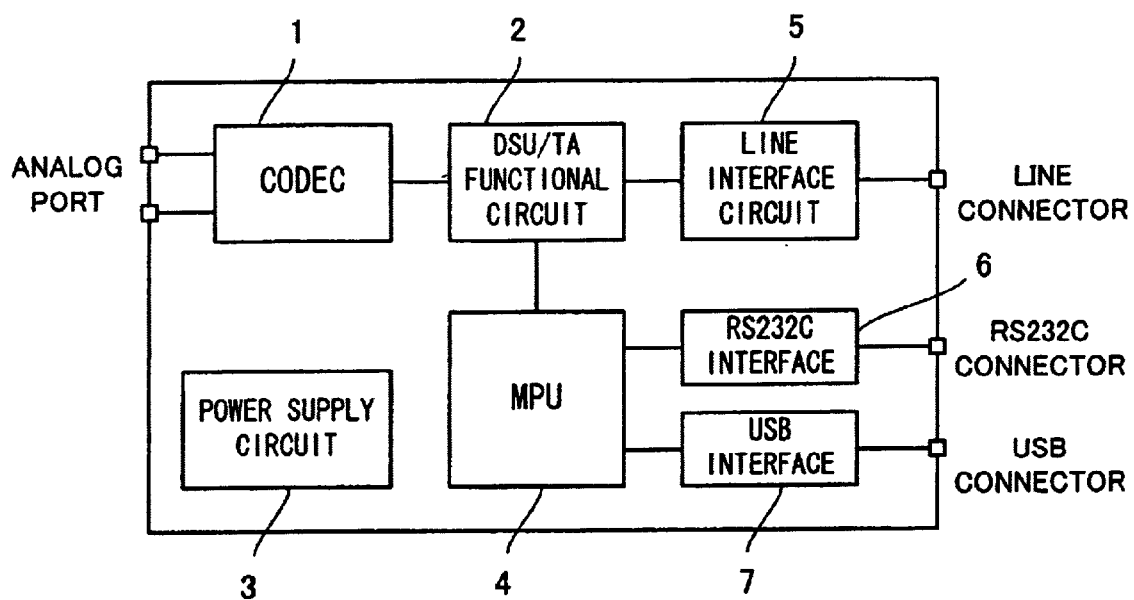
FIG. 1 is a block diagram showing a communication terminal unit, to which a signal processing apparatus according to the present invention is applicable.

FIG. 1 shows a communication terminal, to which the present invention is applicable. The communication terminal includes a CODEC 1; a DSU/TA functional circuit 2; a power supply circuit 3; an MPU (Micro-Processing Unit) 4; a line interface circuit 5; an RS232C interface circuit 6 and a USB (Universal Serial Bus) interface circuit 7. The CODEC 1 is connected to analog ports and the functional circuit 2. The MPU 4 is connected to the functional circuit 2; RS232C interface circuit 6 and USB interface circuit 7. The line interface circuit 5 is connected to the functional circuit and a line connector. The RS232C interface circuit 6 and USB interface circuit 7 are connected to RS232C connector and USB connector, respectively.

The communication terminal performs a multi-media communication service, to which an ISDN high-speed communication or a plurality of channel functions can be applied. It is understood that the present invention is not only applicable to the communication terminal unit, shown in FIG. 1, but also applicable to other types of communication terminal units.

Figure 2:
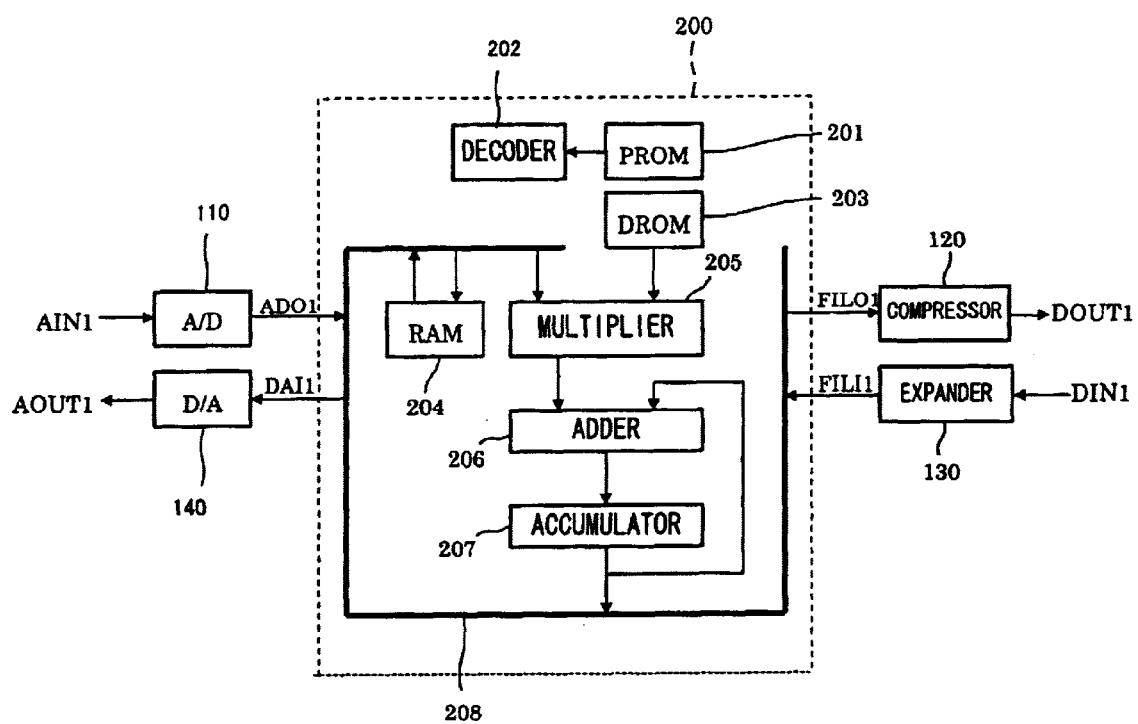
FIG. 2 is a block diagram showing a conventional signal processing apparatus, which processes a single channel of signal.

For better understanding of the present invention, a conventional technology is first described. FIG. 2 shows a conventional signal processing apparatus, which processes a single channel of signal. The signal processing apparatus includes a signal processor 200; an analog/digital (A/D) converter 110, which converts an analog input signal AIN1 into a digital signal ADO1; a digital/analog (D/A) converter 140, which converts a digital signal DAI1 into an analog output signal AOUT1; a compressor 120, which compresses a DSP signal FILO1 to generate an output signal DOUT1; and an expander 130, which expands a digital input signal DIN1 to generate a DSP signal FILI1. The signal processor 200 is connected at an input terminal to the A/D converter 110, and at an output terminal to the digital/analog D/A converter 140. The other output terminal of the signal processor 200 is connected to the compressor 120. The other input terminal of the signal processor 200 is connected to the expander 130.

The signal processor 200 includes a PROM (Programmable ROM) 201, which stores necessary program for signal processing; a decoder 202, which decodes the program stored in the PROM 201; a DROM (Data ROM) 203; and a RAM 204. The signal processor 200 further includes a multiplier 205; an adder 206; an accumulator 207 and a data bus 208.

The DROM 203 is connected at an output terminal to an input terminal of the multiplier 205. The other input terminal of the multiplier 205 is connected to the data bus 208. The RAM 204 is connected to the data bus 208. The multiplier 205 is connected at an output terminal to an input terminal of the adder 206. The adder 206 is connected at an output terminal to an input terminal of the accumulator 207. The accumulator 207 is connected at an output terminal to the data bus 208 and the other input terminal of the adder 206.

In operation, when the analog input signal AIN1 is transmitted toward the signal processor 200, the signal AIN1 is converted by the A/D converter 110 into the digital signal ADO1. When the digital signal ADO1 is supplied to the signal processor 200, the predetermined processing, such as filtering, is carried out to the digital signal ADO1 in accordance with the program read from the PROM 201 to generate the DSP signal FILO1. The DSP signal FILO1 is compressed by the compressor 120 and is outputted as an output signal DOUT1.

On the other hand, when the digital input signal DIN1 is transmitted toward the signal processor 200, the signal DIN1 is expanded by the expander 130 to generate the DSP signal FILI1. When the DSP signal FILI1 is supplied to the signal processor 200, the predetermined processing, such as filtering, is carried out to the DSP signal FILI1 in accordance with the program read from the PROM 201 to generate the processed signal DAI1. After that, the signal DAI1 is converted by the D/A converter 140 into the analog output signal AOUT1.

Figure 3:
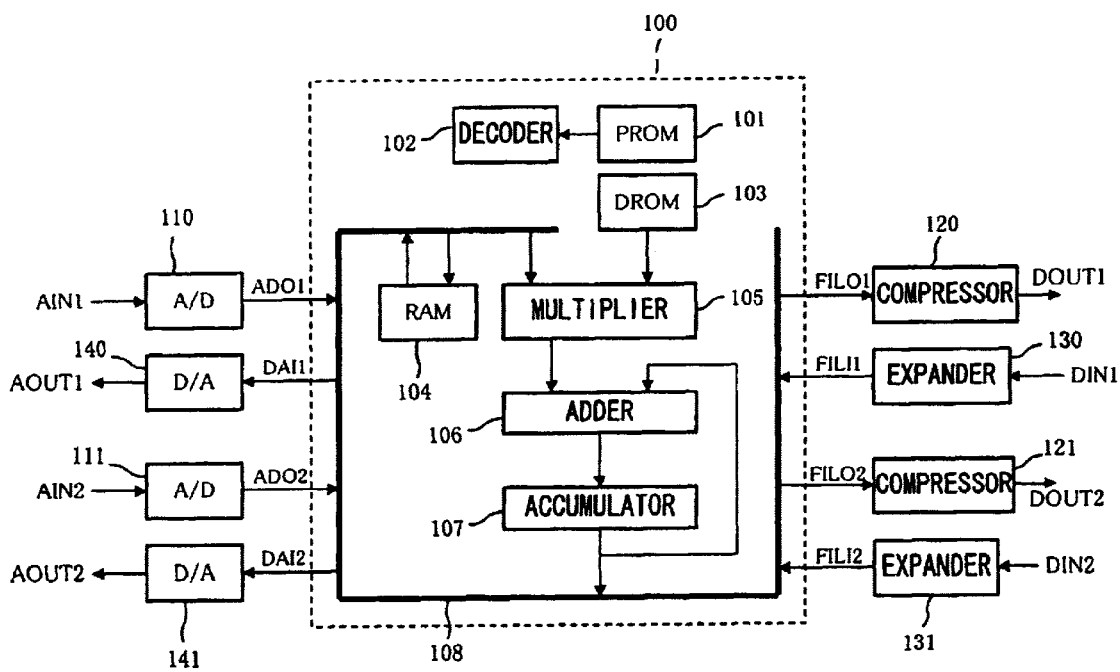
FIG. 3 is a block diagram showing another conventional signal processing apparatus, which processes signals transmitted on a plurality of different channels.

FIG. 3 shows another conventional signal processing apparatus, which processes signals transmitted on two different channels. The signal processing apparatus includes a signal processor 100; analog/digital (A/D) converters 110 and 111; digital/analog (D/A) converters 140 and 141; compressors 120 and 121 and expanders 130 and 131. The signal processor 100 is connected to the A/D converter 110 and D/A converter 140, for a first channel; and to the A/D converter 111 and D/A converter 141, for a second channel. The signal processor 100 is also connected to the compressor 120 and expander 130 for the first channel; and to the compressor 121 and expander 131 for the second channel.

For the first channel, the A/D converter 110 converts an analog input signal AIN1 into a digital signal ADO1 to be supplied to the signal processor 100. The D/A converter 140 converts a digital signal DAI1, supplied from the signal processor 100, into an analog output signal AOUT1. The compressor 120 compresses a DSP signal FILO1, supplied from the signal processor 100, to generate an output signal DOUT1. The expander 130 expands a digital input signal DIN1 to generate a DSP signal FILI1 to be supplied to the signal processor 100.

For the second channel, the A/D converter 111 converts an analog input signal AIN2 into a digital signal ADO2 to be supplied to the signal processor 100. The D/A converter 141 converts a digital signal DAI2, supplied from the signal processor 100, into an analog output signal AOUT2. The compressor 121 compresses a DSP signal FILO2, supplied from the signal processor 100, to generate an output signal DOUT2. The expander 131 expands a digital input signal DIN2 to generate a DSP signal FILI2 to be supplied to the signal processor 100.

The signal processor 100 includes a PROM (Programmable ROM) 101, which stores necessary program for signal processing; a decoder 102, which decodes the program stored in the PROM 101; a DROM (Data ROM) 103; and a RAM 104. The signal processor 100 further includes a multiplier 105; an adder 106; an accumulator 107; and a data bus 108.

The DROM 103 is connected at an output terminal to an input terminal of the multiplier 105. The other input terminal of the multiplier 105 is connected to the data bus 108. The RAM 104 is connected to the data bus 108. The multiplier 105 is connected at an output terminal to an input terminal of the adder 106. The adder 106 is connected at an output terminal to an input terminal of the accumulator 107. The accumulator 107 is connected at an output terminal to the data bus 108 and the other input terminal of the adder 106.

Next, the operation of the signal processor 100 for the first channel will be described. When the analog input signal AIN1 is transmitted toward the signal processor 100, the signal AIN1 is converted by the A/D converter 110 into the digital signal ADO1. When the digital signal ADO1 is supplied to the signal processor 100, the predetermined processing, such as filtering, is carried out to the digital signal ADO1 in accordance with the program read from the PROM 101 to generate the DSP signal FILO1. The DSP signal FILO1 is compressed by the compressor 120 and is outputted as an output signal DOUT1.

When the digital input signal DIN1 is transmitted toward the signal processor 100, the signal DIN1 is expanded by the expander 130 to generate the DSP signal FILI1. When the DSP signal FILI1 is supplied to the signal processor 100, the predetermined processing, such as filtering, is carried out to the DSP signal FILI1 in accordance with the program read from the PROM 201 to generate the signal DAI1. After that, the signal DAI1 is converted by the D/A converter 140 into the analog output signal AOUT1.

Next, the operation of the signal processor 100 for the second channel will be described. When the analog input signal AIN2 is transmitted toward the signal processor 100, the signal AIN2 is converted by the A/D converter 111 into the digital signal ADO2. When the digital signal ADO2 is supplied to the signal processor 100, the predetermined processing, such as filtering, is carried out to the digital signal ADO2 in accordance with the program read from the PROM 101 to generate the DSP signal FILO2. The DSP signal FILO2 is compressed by the compressor 121 and is outputted as an output signal DOUT2.

When the digital input signal DIN2 is transmitted toward the signal processor 100, the signal DIN2 is expanded by the expander 131 to generate the DSP signal FILI2. When the DSP signal FILI2 is supplied to the signal processor 100, the predetermined processing, such as filtering, is carried out to the DSP signal FILI2 in accordance with the program read from the PROM 101 to generate the processed signal DAI2. After that, the signal DAI2 is converted by the D/A converter 141 into the analog output signal AOUT2.

Figure 4:
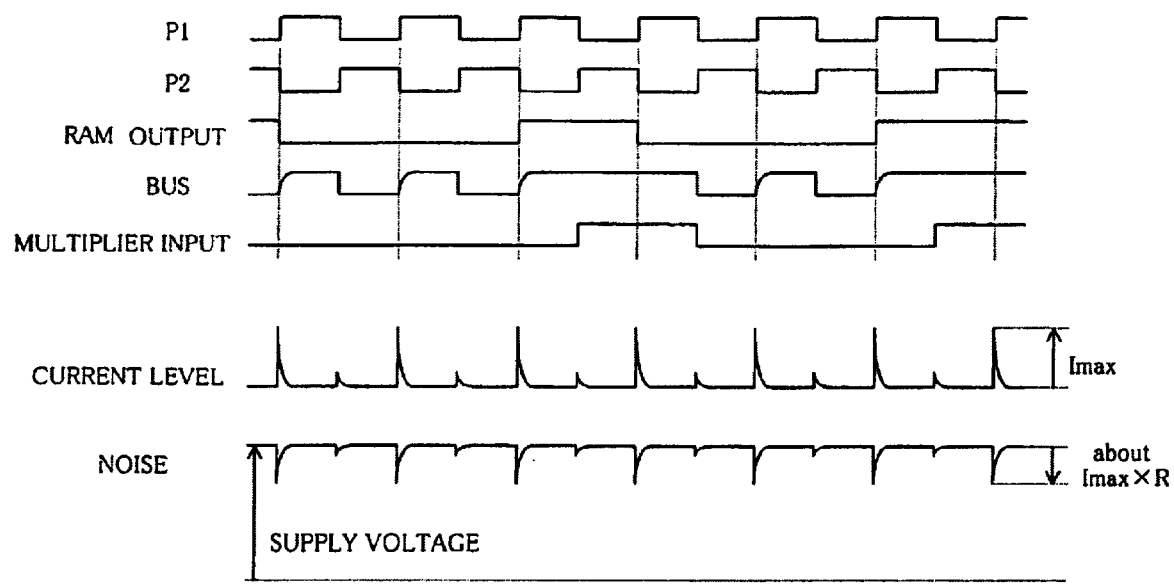
FIG. 4 is a timing chart showing the operation of the conventional signal processing apparatus, shown in FIG. 3.

FIG. 4 shows variation of signal levels in the signal processing apparatus, shown in FIG. 3, in which one bit operation of RAM 104, data bus 108 and multiplier 105 is carried out.

The signal processor 100 operates in accordance with a clock P1 of a first phase and with a clock P2 of a second phase. When the clock P1 turns to high "H", the data bus 108 is pre-charged to turn to high "H". While the clock P1 keeps being low "L" and clock P2 keeps being high "H", the data bus 108 turns to low "L" and high "H" in response to low "L" and high "H" of the RAM output, respectively. Output signal of the data bus 108 is supplied to the multiplier 105 when the first clock P1 turns to high.

In general, signal sampling for each channel is carried out at 8 kHz, and 128 steps are included in each sampling process. The signal processor 100 is required to have a performance of 1 MIPS for each channel. That is, the signal processor 100 would be required to have a performance or capability of nMIPS when processing "n" channels of signals. When signal-processing performance is increased, it is required to increase operation speed of inner circuits, such as PROM, DROM and multiplier. At the same time, the clock must be "n" times faster.

For that reason, when a plurality of channels is processed in a signal processor, electric current flowing therein is increased. Further, in response to increase of the operation speed in the signal processor 100, the analog circuits, such as A/D converters (110, 111) and D/A converters (140, 141) are affected by noise (power supply noise) easily.

Figure 5:
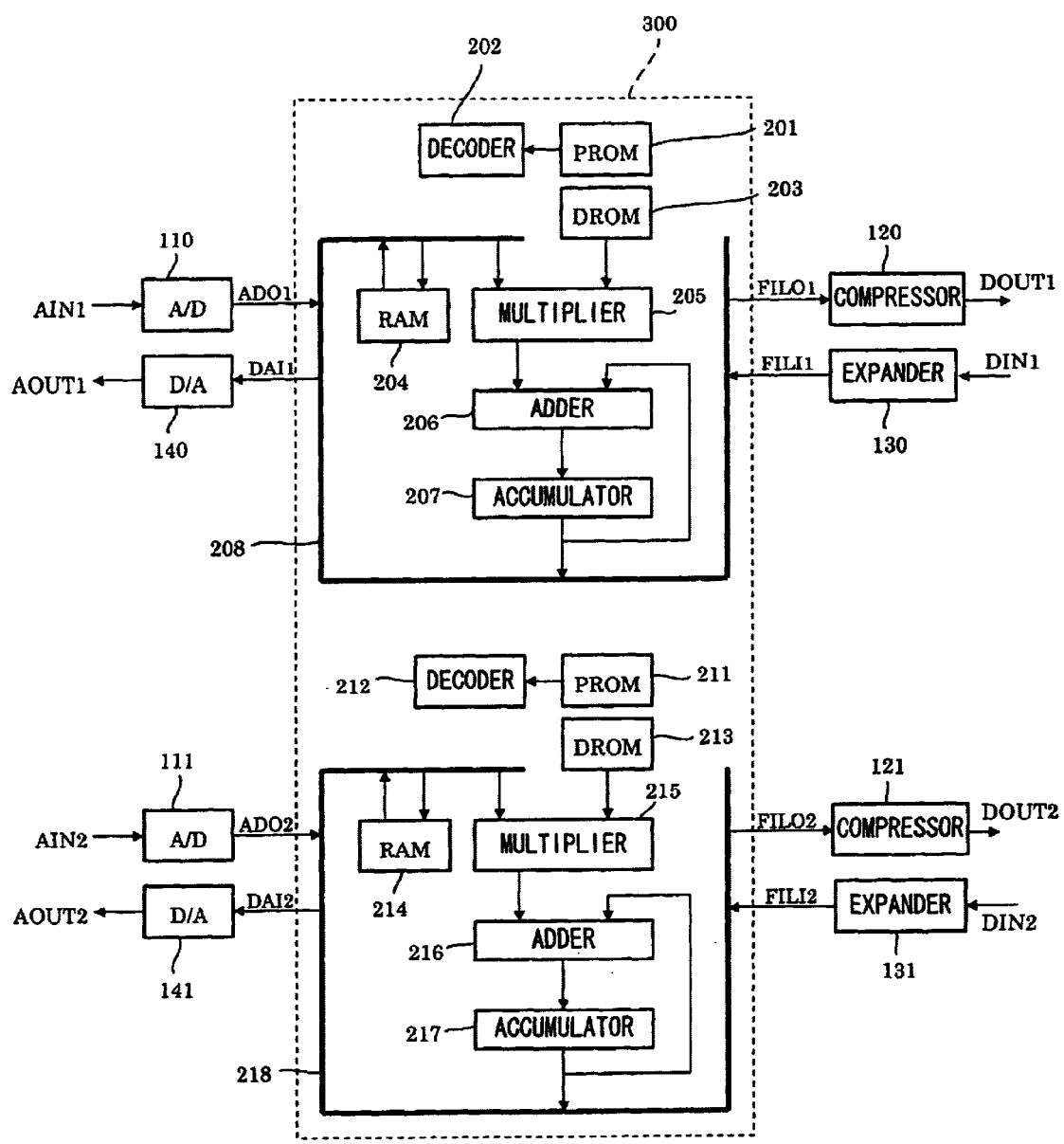
FIG. 5 is a block diagram showing a signal processing apparatus according to a first preferred embodiment of the present invention.

FIG. 5 shows a signal processing apparatus, which processes signals transmitted on two different channels, according to a first preferred embodiment of the present invention. The signal processing apparatus includes a signal processor 300, which includes a first channel part and a second channel part.

The first channel part of the signal processor 300 includes a first PROM (Programmable ROM) 201, which stores necessary program for signal processing; a first decoder 202, which decodes the program stored in the first PROM 201; a first DROM (Data ROM) 203, which stores necessary data for signal processing; and a first RAM 204. The first channel part of the signal processor 300 further includes a first multiplier 205; a first adder 206; a first accumulator 207 and a first data bus 208.

The first DROM 203 is connected at an output terminal to an input terminal of the first multiplier 205. The other input terminal of the first multiplier 205 is connected to the first data bus 208. The first RAM 204 is connected to the first data bus 208. The first multiplier 205 is connected at an output terminal to an input terminal of the first adder 206. The first adder 206 is connected at an output terminal to an input terminal of the first accumulator 207. The first accumulator 207 is connected at an output terminal to the first data bus 208 and the other input terminal of the first adder 206.

The signal processing apparatus further includes first and second analog/digital (A/D) converters 110 and 111; first and second digital/analog (D/A) converters 140 and 141; first and second compressors 120 and 121 and first and second expanders 130 and 131.

The first part of the signal processor 300 is connected to the first A/D converter 110, first D/A converter 140, first compressor 120 and first expander 130.

The second channel part of the signal processor 300 includes a second PROM 211, which stores necessary program for signal processing; a second decoder 212, which decodes the program stored in the second PROM 211; a second DROM 213, which stores necessary data for signal processing; and a second RAM 214. The second channel part of the signal processor 300 further includes a second multiplier 215; a second adder 216; a second accumulator 217; and a second data bus 218.

The second DROM 213 is connected at an output terminal to an input terminal of the second multiplier 215. The other input terminal of the second multiplier 215 is connected to the second data bus 218. The second RAM 214 is connected to the second data bus 218. The second multiplier 215 is connected at an output terminal to an input terminal of the second adder 216. The second adder 216 is connected at an output terminal to an input terminal of the second accumulator 217. The second accumulator 217 is connected at an output terminal to the second data bus 218 and the other input terminal of the second adder 216.

The second part of the signal processor 300 is connected to the second A/D converter 111, second D/A converter 141, second compressor 121 and second expander 131.

For the first channel, the first A/D converter 110 converts an analog input signal AIN1 into a digital signal ADO1 to be supplied to the signal processor 300. The first D/A converter 140 converts a digital signal DAI1, supplied from the signal processor 300, into an analog output signal AOUT1. The first compressor 120 compresses a DSP signal FILO1, supplied from the signal processor 300, to generate an output signal DOUT1. The first expander 130 expands a digital input signal DIN1 to generate a DSP signal FILI1 to be supplied to the signal processor 300.

For the second channel, the second A/D converter 111 converts an analog input signal AIN2 into a digital signal ADO2 to be supplied to the signal processor 300. The second D/A converter 141 converts a signal DAI2, supplied from the signal processor 300, into an analog output signal AOUT2. The second compressor 121 compresses a DSP signal FILO2, supplied from the signal processor 300, to generate an output signal DOUT2. The second expander 131 expands a digital input signal DIN2 to generate a DSP signal FILI2 to be supplied to the signal processor 300.

Next, the operation of the signal processor 300 for the first channel will be described. When the analog input signal AIN1 is transmitted toward the signal processor 300, the signal AIN1 is converted by the first A/D converter 110 into the digital signal ADO1. When the digital signal ADO1 is supplied to the signal processor 300, the predetermined processing, such as filtering, is carried out to the digital signal ADO1 in accordance with the program read from the first PROM 201 to generate the DSP signal FILO1. The DSP signal FILO1 is compressed by the first compressor 120 and is outputted as a digital signal DOUT1.

When the digital input signal DIN1 is transmitted toward the signal processor 300, the digital signal DIN1 is expanded by the first expander 130 to generate the DSP signal FILI1. When the DSP signal FILI1 is supplied to the signal processor 300, the predetermined processing, such as filtering, is carried out to the DSP signal FILI1 in accordance with the program read from the first PROM 201 to generate the signal DAI1. After that, the signal DAI1 is converted by the first D/A converter 140 into the analog output signal AOUT1.

Next, the operation of the signal processor 300 for the second channel will be described. When the analog input signal AIN2 is transmitted toward the signal processor 300, the signal AIN2 is converted by the second A/D converter 111 into the digital signal ADO2. When the digital signal ADO2 is supplied to the signal processor 300, the predetermined processing, such as filtering, is carried out to the digital signal ADO2 in accordance with the program read from the second PROM 211 to generate the DSP signal FILO2. The DSP signal FILO2 is compressed by the second compressor 121 and is outputted as a digital signal DOUT2.

When the digital input signal DIN2 is transmitted toward the signal processor 300, the digital signal DIN2 is expanded by the second expander 131 to generate the DSP signal FILI2. When the DSP signal FILI2 is supplied to the signal processor 300, the predetermined processing, such as filtering, is carried out to the DSP signal FILI2 in accordance with the program read from the second PROM 211 to generate the signal DAI2. After that, the signal DAI2 is converted by the second D/A converter 141 into the analog output signal AOUT2.

As described above, according to the first preferred embodiment of the present invention, signals transmitted on the first and second channels are independently processed by the first channel part and second channel part of the signal processor 300, respectively. Therefore, the signal processor 300 can operate with the same performance and clock as those in the case of single channel processing without increasing power consumption. In other words, it is not required to improve the performance of the signal processor when processing a plurality of channels of signals.

Figure 6:
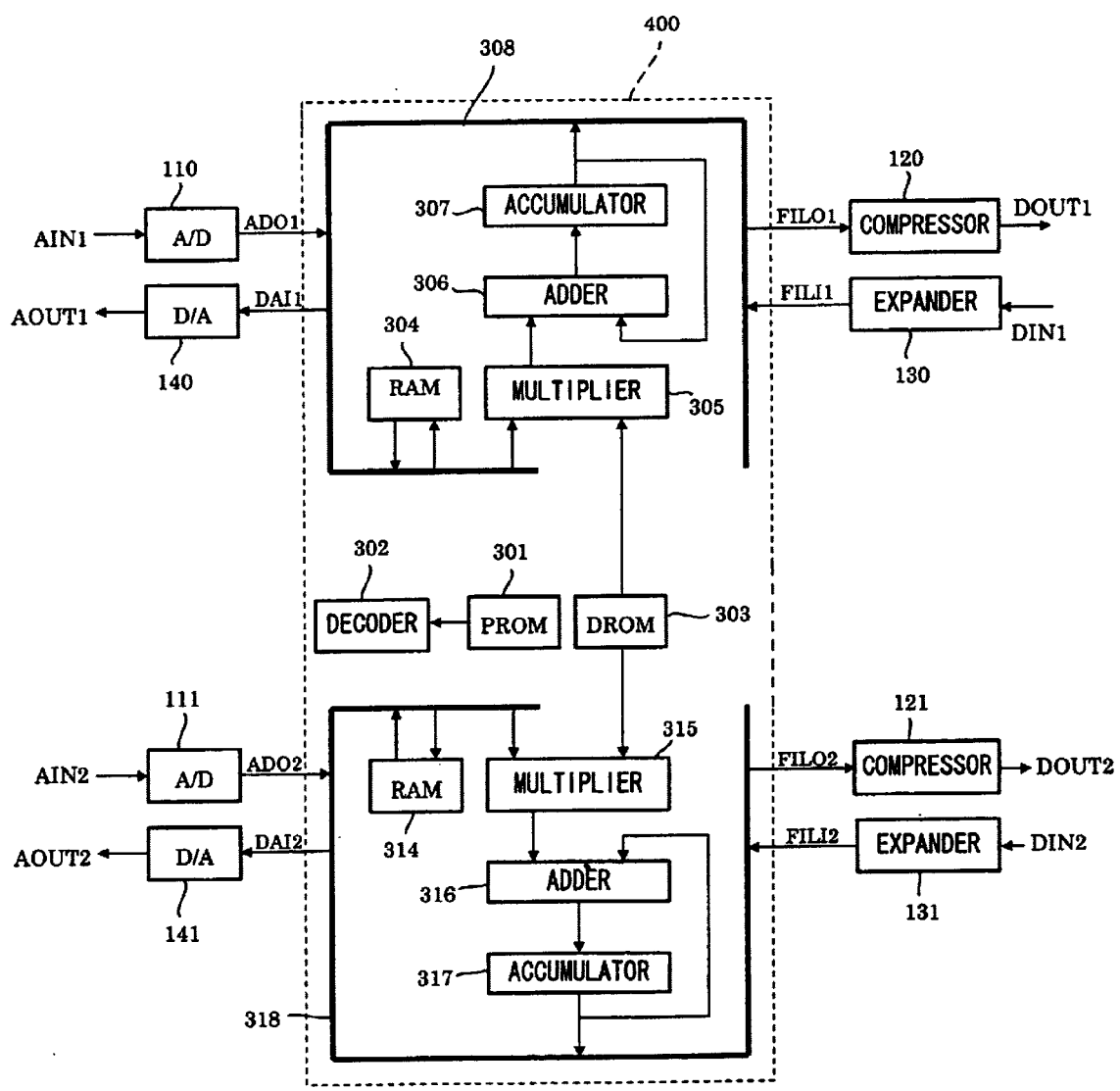
FIG. 6 is a block diagram showing a signal processing apparatus according to a second preferred embodiment of the present invention.

FIG. 6 shows a signal processing apparatus, which processes signals transmitted on two different channels, according to a second preferred embodiment of the present invention. The signal processing apparatus includes a signal processor 400, which includes a first channel part and a second channel part.

The signal processing apparatus further includes a shared PROM (Programmable ROM) 301, which stores necessary program for signal processing; a shared decoder 302, which decodes the program stored in the shared PROM 301 and a shared DROM (Data ROM) 303, which stores necessary data for signal processing. As the names show, the first channel and second channel parts of the signal processor 400 commonly use the PROM 301, decoder 302 and DROM 303.

The first channel part of the signal processor 400 includes a first RAM 304, a first multiplier 305, a first adder 306, a first accumulator 307 and a first data bus 308. The first multiplier 305 is connected at input terminals to an output terminal of the shared DROM 303 and to the first data bus 308. The first RAM 304 is connected to the first data bus 308. The first multiplier 305 is connected at an output terminal to an input terminal of the first adder 306. The first adder 306 is connected at an output terminal to an input terminal of the first accumulator 307. The first accumulator 307 is connected at an output terminal to the first data bus 308 and the other input terminal of the first adder 306.

The signal processing apparatus further includes first and second analog/digital (A/D) converters 110 and 111; first and second digital/analog (D/A) converters 140 and 141; first and second compressors 120 and 121 and first and second expanders 130 and 131.

The first part of the signal processor 400 is connected to the first A/D converter 110, first D/A converter 140, first compressor 120 and first expander 130.

The second channel part of the signal processor 400 includes a second RAM 314, a second multiplier 315, a second adder 316, a second accumulator 317 and a second data bus 318. The second multiplier 315 is connected at input terminals to the other output terminal of the shared DROM 303 and to the second data bus 318. The second RAM 314 is connected to the second data bus 318. The second multiplier 315 is connected at an output terminal to an input terminal of the second adder 316. The second adder 316 is connected at an output terminal to an input terminal of the second accumulator 317. The second accumulator 317 is connected at an output terminal to the second data bus 318 and the other input terminal of the second adder 316.

The second part of the signal processor 400 is connected to the second A/D converter 111, second D/A converter 141, second compressor 121 and second expander 131.

For the first channel, the first A/D converter 110 converts an analog input signal AIN1 into a digital signal ADO1 to be supplied to the signal processor 400. The first D/A converter 140 converts a digital signal DAI1, supplied from the signal processor 400, into an analog output signal AOUT1. The first compressor 120 compresses a DSP signal FILO1, supplied from the signal processor 400, to generate an output signal DOUT1. The first expander 130 expands a digital input signal DIN1 to generate a DSP signal FILI1 to be supplied to the signal processor 400.

For the second channel, the second A/D converter 111 converts an analog signal AIN2 into a digital signal ADO2 to be supplied to the signal processor 400. The second D/A converter 141 converts a digital signal DAI2, supplied from the signal processor 400, into an analog output signal AOUT2. The second compressor 121 compresses a DSP signal FILO2, supplied from the processor 400, to generate an output signal DOUT2. The second expander 131 expands a digital input signal DIN2 to generate a DSP signal FILI2 to be supplied to the signal processor 400.

Next, the operation of the signal processor 400 for the first channel will be described. When the analog input signal AIN1 is transmitted toward the signal processor 400, the signal AIN1 is converted by the first A/D converter 110 into the digital signal ADO1. When the digital signal ADO1 is supplied to the signal processor 400, the predetermined processing, such as filtering, is carried out to the digital signal ADO1 in accordance with the program read from the shared PROM 301 to generate the DSP signal FILO1. The DSP signal FILO1 is compressed by the first compressor 120 and is outputted as a digital signal DOUT1.

When the digital input signal DIN1 is transmitted toward the signal processor 400, the digital signal DIN1 is expanded by the first expander 130 to generate the DSP signal FILI1. When the DSP signal FILI1 is supplied to the signal processor 400, the predetermined processing, such as filtering, is carried out to the DSP signal FILI1 in accordance with the program read from the shared PROM 301 to generate the signal DAI1. After that, the signal DAI1 is converted by the first D/A converter 140 into the analog output signal AOUT1.

Next, the operation of the signal processor 400 for the second channel will be described. When the analog input signal AIN2 is transmitted toward the signal processor 400, the signal AIN2 is converted by the second A/D converter 111 into the digital signal ADO2. When the digital signal ADO2 is supplied to the signal processor 400, the predetermined processing, such as filtering, is carried out to the digital signal ADO2 in accordance with the program read from the shared PROM 301 to generate the DSP signal FILO2. The DSP signal FILO2 is compressed by the second compressor 121 and is outputted as a digital signal DOUT2.

When the digital input signal DIN2 is transmitted toward the signal processor 400, the digital signal DIN2 is expanded by the second expander 131 to generate the DSP signal FILI2. When the DSP signal FILI2 is supplied to the signal processor 400, the predetermined processing, such as filtering, is carried out to the DSP signal FILI2 in accordance with the program read from the shared PROM 301 to generate the signal DAI2. After that, the signal DAI2 is converted by the second D/A converter 141 into the analog output signal AOUT2.

As described above, according to the second preferred embodiment of the present invention, signals transmitted on the first and second channels are independently processed by the first channel part and second channel part of the signal processor 400, respectively. Therefore, the signal processor 400 can operate with the same performance and clock as those in the case of single channel processing without increasing power consumption. In other words, it is not required to improve the performance of the signal processor when processing a plurality of channels of signals. In addition, the first channel part and second channel part of the signal processor 400 shares the PROM, decoder and DROM, so that the circuitry can be designed smaller and power consumption is decreased.

Figure 7:
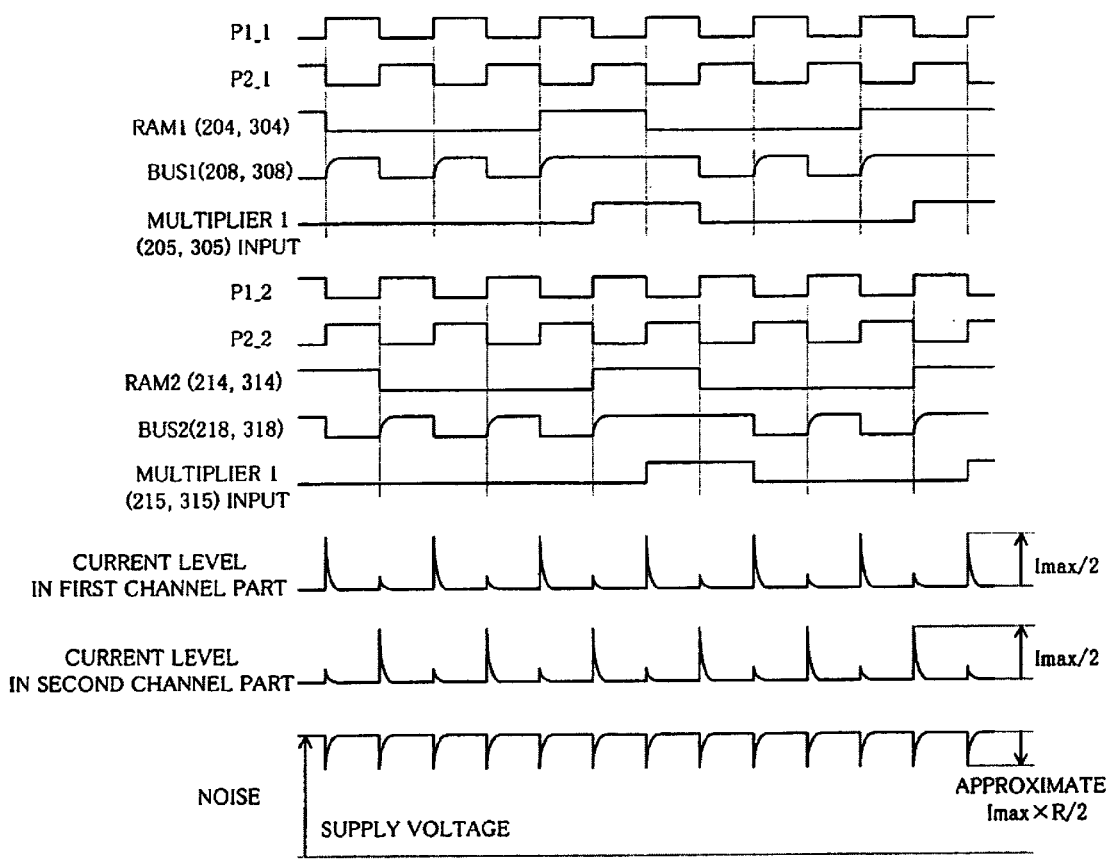
FIG. 7 is a timing chart showing the operation of the first and second preferred embodiments.

FIG. 7 shows variation of signal levels in the signal processing apparatus, according to the first and second preferred embodiments, shown in FIGS. 5 and 6.

The first channel part of the signal processor (300, 400) operates in accordance with clocks P1_1 and P2_1, while the second channel part of the signal processor (300, 400) operates in accordance with clocks P1_2 and P2_2. The clocks P1_1 and P2_2 have the same phase, while the clocks P1_2 and P2_1 have the same phase. In other words, the first channel and second channel signals are processed in accordance with the different (shifted) clocks.

As shown in FIG. 7, when the first data bus (208, 308) is pre-charged in the first channel part of the signal processor (300, 400), data are supplied to the second data bus (218, 318) in the second channel part of the signal processor (300, 400). In contrast, when data are supplied to the first data bus (208, 308) in the first channel part of the signal processor (300, 400), the second data bus (218, 318) is pre-charged in the second channel part of the signal processor (300, 400).

When the phase P1 turns to high "H" to start pre-charging of the data bus, the all the bus lines turn to high "H". As a result, a large amount of electric current flows through the signal processor (300, 400). In FIG. 7, "Imax" indicates the maximum value of current in a pre-charging mode when both the first channel part and second channel part of the signal processor (300, 400) operate at the same phase. "R" and "Vmax" indicate the impedance of the power supply and the maximum noise voltage of the power supply, respectively. The maximum noise voltage "Vmax" is calculated by the following equation:

$$Vmax = Imax \times R \ (V)$$

According to the embodiments, the maximum current level in the pre-charge mode is "Imax/2" for each channel part of the signal processor (300, 400), so that the maximum noise voltage becomes "Vmax/2".

As described above, according to the embodiment shown in FIG. 7, the first channel part and second channel part of the signal processor (300, 400) operate at the different phases, so that electric current flowing in the signal processing apparatus is dispersed and decreased. As a result, power supply noise is reduced; and therefore, it becomes possible that error operations are prevented and undesirable noise affection to the analog circuits is reduced.

According to the present invention, compressor and expander may be omitted, so that a digital signal is directly inputted to the signal processor without expanding and a processed signal is directly outputted without compressing. Compressing and expanding operation may be carried out in the signal processor. More than two channels of processing can be realized by the present invention.

In the second preferred embodiment, shown in FIG. 6, only PROM may be shared by the first channel and second channel parts of the signal processor 400. Other circuits may be shared by the first channel and second channel parts of the signal processor 400.

In the embodiment, shown in FIG. 7, the signal processor may be designed to operate at more than three phases of clocks. When more than three channels of signals are processed in a signal processor, which operates in accordance with two-phase clocks, or when more than four channels of signals are processed in a signal processor, which operates in accordance with three-phase clocks, it is not required to use one phase to one channel. In other words, a channel of signal may be processed in accordance with clocks having more than two phases. Further, a signal processor, which operates in accordance with clock having three phases, is designed to process two channels of signals.

What is claimed is:

1. A signal processing apparatus, comprising:
   a first channel part which processes a predetermined first channel of signal;
   a second channel part which processes a second channel of signal independently from the processing by the first channel part;
   a first input circuit which receives an input signal transmitted on the first channel and supplies it to the first channel part;
   a first output circuit which outputs the signal processed by the first channel part;
   a second input circuit which receives an input signal transmitted on the second channel and supplies it to the second channel part; and
   a second output circuit which outputs the signal processed by the second channel part, wherein
   the first input circuit comprises an expander, which expands the input signal,
   the first output circuit comprises a compressor, which compresses the signal to be outputted,
   the second input circuit comprises an expander, which expands the input signal, and
   the second output circuit comprises a compressor, which compresses the signal to be outputted.

2. An apparatus according to claim 1, further comprising:
   a first input port which receives the first channel of signal to be inputted into the first channel part, the first input circuit being interposed between said first input port and said first channel part;
   a first output port which outputs a signal processed by the first channel part, the first output circuit being interposed between said first channel part and said first output port;
   a second input port which receives the second channel of signal to be inputted into the second channel part, the second input circuit being interposed between said second input port and said second channel part; and a second output port which outputs a signal processed by the second channel part, the second output circuit being interposed between said second channel part and said second output port.

3. An apparatus according to claim 1, wherein
the first input circuit further comprises an A/D (Analog to Digital) converter, which converts an analog input signal into a digital input signal,
the first output circuit further comprises a D/A (Digital to Analog) converter, which converts a processed digital signal into an analog signal to be outputted,
the second input circuit further comprises an A/D (Analog to Digital) converter, which converts an analog input signal into a digital input signal, and
the second output circuit further comprises a D/A (Digital to Analog) converter, which converts a processed digital signal into an analog signal to be outputted.

4. An apparatus according to claim 1, wherein
the first channel part further comprises a first PROM, which stores necessary program for the signal processing of the first channel; a first decoder, which decodes the program stored in the first PROM; and a first DROM, which stores data used for the signal processing; and
the second channel part further comprises a second PROM, which stores necessary program for the signal processing of the second channel; a second decoder, which decodes the program stored in the second PROM; and a second DROM, which stores data used for the signal processing.

5. An apparatus according to claim 1, further comprising:
a PROM, which stores necessary program for the signal processing;
a decoder, which decodes the program stored in the PROM; and
a DROM, which stores data used for the signal processing,
wherein the PROM, decoder and DROM are commonly used both for processing signals of the first and second channels.

6. A communication terminal comprising a signal processing apparatus according to claim 1.

7. A signal processing apparatus, comprising:
a first channel part which processes a predetermined first channel of signal in accordance with a first clock; and
a second channel part which processes a predetermined second channel of signal in accordance with a second clock independently from the processing by the first channel part,
wherein the first clock and second clock are shifted in phase so that electric current flowing in the apparatus is dispersed and decreased.

8. An apparatus according to claim 7, wherein
the first clock has more than two different phases, and
the second clock has more than two different phases.

9. A signal processing apparatus, comprising:
a first channel part which processes a predetermined first channel of signal in accordance with a first clock;
a first input circuit which receives an input signal transmitted on the first channel and supplies it to the first channel part;
a first output circuit which outputs the signal processed by the first channel part;
a second channel part which processes a predetermined second channel of signal in accordance with a second clock independently from the processing by the first channel part;

a second input circuit which receives an input signal transmitted on the second channel and supplies it to the second channel part;
a second output circuit which outputs the signal processed by the second channel part;
a PROM, which stores programming for the signal processing; a decoder, which decodes the programming stored in the PROM; and
a DROM, which stores data used for the signal processing,
wherein the first clock and second clock are shifted in phase such that electric current flowing in the apparatus is dispersed and decreased.

10. A communication terminal comprising a signal processing apparatus according to claim 9.

11. An apparatus according to claim 9, wherein the PROM, decoder, and DROM process signals of both the first and second channels.

12. An apparatus according to claim 9, wherein
the PROM comprises a first PROM, which stores necessary program for the signal processing to the first channel, and a second PROM, which stores necessary program for the signal processing the second channel;
the decoder comprises a first decoder, which decodes the program stored in the first PROM, and a second decoder, which decodes the program stored in the second PROM; and
the DROM comprises a first DROM, which stores data used for the signal processing to the first channel, and a second DROM, which stores data used for the signal processing to the second channel.

13. A signal processing apparatus, comprising:
a first channel part which processes a predetermined first channel of signal;
a second channel part which processes a second channel of signal independently from the processing by the first channel part;
a first input port which receives the first channel of signal to be inputted into the first channel part;
a second input port which receives the second channel of signal to be inputted into the second channel part;
a first output port which outputs a signal processed by the first channel part;
a second output port which outputs a signal processed by the second channel part;
a first input circuit interposed between said first input port and said first channel part which receives an input signal transmitted on the first channel and supplies it to the first channel part;
a first output circuit interposed between said first channel part and said first output port which outputs the signal processed by the first channel part;
a second input circuit interposed between said second input port and said second channel part which receives an input signal transmitted on the second channel and supplies it to the second channel part; and
a second output circuit interposed between said second channel part and said second output port which outputs the signal processed by the second channel part, wherein
the first input circuit comprises an expander, which expands the input signal, and an A/D (Analog to Digital) converter, which converts an analog input signal into a digital input signal, the first output circuit comprises a compressor, which compresses the signal to be outputted and a D/A (Digital to Analog) converter, which converts a processed digital signal into an analog signal to be outputted, the second input circuit comprises an expander, which expands the input signal, and an A/D (Analog to Digital) converter, which converts an analog input signal into a digital input signal, and the second output circuit comprises a compressor, which compresses the signal to be outputted, and a D/A (Digital to Analog) converter, which converts a processed digital signal into an analog signal to be outputted.

14. A signal processing apparatus, comprising:

a first channel part which processes a predetermined first channel of signal;

a second channel part which processes a second channel of signal independently from the processing by the first channel part;

a first input port which receives the first channel of signal to be inputted into the first channel part;

a second input port which receives the second channel of signal to be inputted into the second channel part;

a first output port which outputs a signal processed by the first channel part;

a second output port which outputs a signal processed by the second channel part; wherein the first channel part further comprises a first PROM, which stores necessary program for the signal processing of the first channel; a first decoder, which decodes the program stored in the first PROM; and a first DROM (Data ROM), which stores data used for the signal processing; and the second channel part further comprises a second PROM, which stores necessary program for the signal processing of the second channel; a second decoder, which decodes the program stored in the second PROM; and a second DROM, which stores data used for the signal processing.

* * * * *